United States Patent [19]
Watanabe et al.

[11] Patent Number: 5,798,510
[45] Date of Patent: Aug. 25, 1998

[54] APPARATUS FOR AND METHOD OF READING A BAR CODE

[75] Inventors: Mitsuo Watanabe; Shinichi Sato; Isao Iwaguchi; Ichiro Shinoda, all of Kanagawa, Japan

[73] Assignee: Fujitsu Limited, Kawasaki, Japan

[21] Appl. No.: 654,417

[22] Filed: May 28, 1996

[30] Foreign Application Priority Data

Sep. 14, 1995 [JP] Japan ................... 7-237326

[51] Int. Cl.[6] ...................................... G06K 7/10
[52] U.S. Cl. ............................... 235/462; 235/463
[58] Field of Search ............................. 235/462, 463

[56] References Cited

U.S. PATENT DOCUMENTS

| | | | |
|---|---|---|---|
| 5,124,538 | 6/1992 | Lapinski et al. | 235/463 |
| 5,262,625 | 11/1993 | Tom et al. | 235/462 |
| 5,278,398 | 1/1994 | Pavlidis et al. | 235/462 |
| 5,296,691 | 3/1994 | Waldron et al. | 235/462 |
| 5,493,108 | 2/1996 | Cherry et al. | 235/463 |

*Primary Examiner*—Harold Pitts
*Attorney, Agent, or Firm*—Armstrong, Westerman, Hattori, McLeland & Naughton

[57] ABSTRACT

A bar code recognizing/demodulating circuit compares with each other a demodulated data string including a start bar but excluding an end bar and a demodulated data string including the end bar but excluding the start bar among a variety of demodulated data strings obtained by a scan/convergence optical system scanning a bar code. A total sum of the numbers of digits of the two demodulated data strings is detected, and whether the total sum is larger than the number of digits of the bar code to be read is checked. If larger than the number of digits of the bar code, whether data of overlapped portions of the two demodulated data strings coincide with each other is checked. If coincident, demodulated data corresponding to the whole bar code are synthesized based on the two demodulated data strings.

8 Claims, 12 Drawing Sheets

FIG. 8
| NUMBER OF DIGITS OF DATA TO BE READ | 5 | 6~9 | 10~13 | 14~17 | 18~20 |
|---|---|---|---|---|---|
| MINIMUM NUMBER OF EFFECTIVE DATA DIGITS | 3 | 4 | 5 | 6 | 7 |
FIG. 9
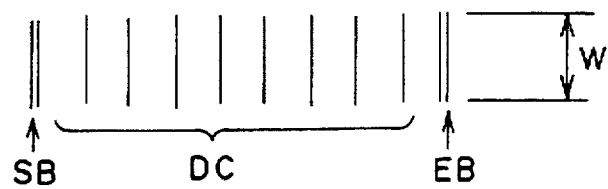
FIG. 10
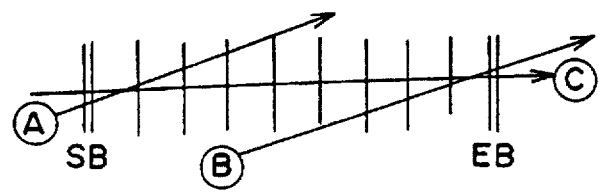

FIG. 14

| NUMBER OF DIGITS OF DATA TO BE READ | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|
| NUMBER OF DIGITS OF SYNTHESIZED DATA | 4 | 5 | 6 | 7 | 8 | 9 | 11 | 12 | 13 | 14 | 15 | 16 | 18 | 19 | 20 | 21 | 22 | 23 |

APPARATUS FOR AND METHOD OF READING A BAR CODE

BACKGROUND OF THE INVENTION

1. Field of the Invention

The present invention relates generally to an apparatus for and a method of reading a bar code with such a structure that data characters are interposed between a start bar and an end bar. The present invention relates more particularly to a bar code reading apparatus and a bar code reading method that are contrived to acquire read data corresponding to the whole bar code by synthesizing the read data including the start bar but excluding the end bar and the read data including the end bar but excluding the start bar.

2. Description of the Prior Art

A practice of managing commercial goods, etc. by using bar codes has been popularized in recent years as represented by a POS system in a distribution business, etc. For example, in the POS system of a store, such items of data as kinds, sales prices, etc. of the goods are encoded in a bar code format and labeled on the goods. Then, the price is paid based on the read bar codes at a cash register, and the numbers of sold goods are added up in real time, which might be useful for stocking and purchasing managements.

Incidentally, the above bar code is classified roughly into a fixed length code such as a WPC code, a UPC code and an EAN code, and a variable length second code.

The above-mentioned fixed length code includes guard bars affixed to front and rear ends thereof, and center bars inserted to a middle portion thereof. Four or six data characters are stored between each guard bar and the center bar. In the case that only the data character of a first half of the fixed length code is read, this data character might be probably recognized as data constituting the bar code because being interposed between the front-end-side guide bar and the center bar. Similarly, even when only the data character of a last half thereof is read, this data character might be probably recognized as data constituting the bar code because of being interposed between the rear-end-side guard bar and the center bar. Accordingly, it is possible to synthesize the read data corresponding to the whole bar code on the basis of two pieces of read data obtained by individually reading the data character of the first half and the data character of the last half, respectively constituting the bar code.

In contrast with this, the second code is a code with no standard for length (that is the number of bars). The second code may be, e.g., an ITF (Interleaved Two of Five) code, a CODE39, a NW7 and a CODE128. The second code has, as illustrated in FIG. 9, a start bar (which is a start character) SB at the front end and an end bar (which is an end character) EB at the rear end. A variable-length data character DC is stored between the two bars. Then, a prior art bar code reading apparatus recognizes only the data interposed between the bars provided at both ends as the data character DC constituting the second code as in the case of the fixed-length code.

Accordingly, the prior art bar code reading apparatus is capable of recognizing nothing but the data characters interposed between the start bar SB and the end bar EB which is obtained by reading a whole bar code at once as shown by "C" in FIG. 10 as the data constituting the bar code. More specifically, referring to FIG. 10, the read data including the start bar but excluding the end bar indicated which is obtained by reading the bar code along the track shown by "A" and the read data including the end bar but excluding the start bar which is obtained by reading along the track shown by "B", are not recognized as the data characters DC constituting the bar code. It is therefore impossible to synthesize the read data corresponding to the whole bar code on the basis of the above-described two pieces of read data.

FIG. 15 illustrates data reading processes of the prior art bar code reading apparatus. In first step S501 after starting the data reading processes, initialization is executed. To be more specific, a,data character length (which is the number of read digits) of the second code to be read is set.

In next step S502, a detection of the start bar is waited. That is, whether the read data contains the start bar is checked. In step S503 executed when the start bar is detected, whether the end bar is detected is checked. That is, whether the read data contains the end bar is checked. If the end bar is not detected, the read data contains neither the start bar nor the end bar. Hence, there is no such assurance that the read data constitutes the bar code, and the processing consequently returns to step S502.

In step S504 executed when the start and end bars are detected, a length of a first character (adjacent to the start bar) is checked. Then, if the length of the first character is out of the standard, the processing returns to step S502. Contrastingly if the length of the first character conforms to the standard, the first character is converted into data corresponding thereto in step S505.

In next step S506, a length of the adjacent character is checked. Then, if the length of the adjacent character is out of the standard, the processing returns to step S502. Contrastingly if the length of the same character conforms to the standard, this character is converted into the data corresponding thereto in step S507.

Checked in next step S508 is whether the data demodulation performed in steps 505 and S507 is well performed. Then, if the data demodulation is ill performed, the processing returns to step S502.

In contrast with this, if the data demodulation is well done, in step S509, it is checked whether the adjacent character (adjacent to the character read in step S507) is an end character (which is the end bar) or a start character (which is the start bar). Subsequently, if the adjacent character is neither the end character nor the start character, the processing is moved back to step S506, and this adjacent character is demodulated.

Contrastingly, if the adjacent character is the end character or the start character, the demodulations of all the data characters has been completed, and in step S510, the demodulated data are stored. Then, in next step S511, the demodulated data are transmitted to the data processor, and the processing returns to step S502 to demodulate a next bar code.

Generally, however, the second bar is defined as a truncate label having a small width W (see FIG. 9). Accordingly, there are an extremely small amount of data (which are hereinbelow referred to as "continuously read data") containing the start bar SB and the end bar EB, among various items of data acquired by scanning the bar code in a variety of directions. Hence, the conventional reading apparatus takes a long period of time till the reading of the bar code is completed and forces the operator to correct the scan direction many times till the reading is completed.

SUMMARY OF THE INVENTION

It is a primary object of the present invention, which was devised to obviate the above-mentioned problems, to provide a bar code reading apparatus and a bar code reading method which can synthesize demodulated data corresponding to a whole bar code on the basis of the data including a start bar but excluding an end bar, and the data including the end bar but excluding the start bar with a mean to restrain misreading of the data as much as possible and therefore which can complete the reading of the bar code in a short period of time without frequently correcting a scan direction.

To accomplish the above object, according to a first aspect of the present invention, an apparatus for reading a bar code comprises a bright/dark pattern detecting unit, an overlapped portion determining unit and a joining unit. The bright/dark pattern detecting unit scans a bar code interposed between a first bar and a second bar and detects a bright/dark pattern along a scan trajectory thereof. The overlapped portion determining unit determines whether an overlapped portion having the same content is contained in each of a first bright/dark pattern and a second bright/dark pattern when the bright/dark pattern detecting unit detects the first bright/dark pattern along the scan trajectory that passes through not the second bar but the first bar, and the second bright/dark pattern along the scan trajectory that passed through not the first bar but the second bar. The joining unit joins the first bright/dark pattern and the second bright/dark pattern when the overlapped portion determining unit determines that the overlapped portion is contained in each of the first bright/dark pattern and the second bright/dark pattern.

The bright/dark pattern detecting unit may optically reads the bright/dark pattern. In this case, the bar code may be scanned by use of irradiating light beams emitted from an light emitting unit, or alternatively a light receiving portion may be scanned.

The bar code to be read may be a bar code interposed between the first and second bars consisting of predetermined fixed patterns. Hence, it is of no importance to have a fixed length or a variable length. If the bar code to be read has the variable length, it may be CODE128, CODE38, ITF or NW7.

In any case, the bar code is composed of a plurality of characters corresponding to data (defined as code data) in other formats. In this case, the bar code reading apparatus may further comprise a data converting unit for segmenting the bright/dark patterns that are detected by the bright/dark pattern detecting unit per character and converting the thus segmented bright/dark patterns into data in other formats corresponding thereto. In such a case, the overlapped portion determining unit makes the determinations as to the first bright/dark pattern and the second bright/dark pattern which are converted into the data in other formats by the data converting unit. With this construction, the processing proceeds with noises forming no character removed. It is therefore further possible to prevent the data from being misread.

Furthermore, the bar code reading apparatus may further comprise a number-of-characters specifying unit for specifying the number of characters of the bar code to be read.

The overlapped portion determining means may comprise a total sum calculating unit for calculating a total sum of the number of characters of the first bright/dark pattern and the number of characters of the second bright/dark pattern. The overlapped portion determining unit may also comprise a comparing unit for comparing the number of characters that is specified by the number-of-characters specifying unit with the total sum calculated by the total sum calculating unit. The overlapped portion determining unit may make the above determination only when the total sum exceeds the number of characters. Because, in the case the total sum does not exceed the specified number of characters of the bar code, there is no such probability that the overlapped portion is formed, and it is meaningless to make the above-mentioned determination.

The overlapped portion determining unit may also comprise a total sum calculating unit for calculating a total sum of the number of characters of the first bright/dark pattern and the number of characters of the second bright/dark pattern. The overlapped portion determining unit may further comprise a number-of-digits-of-joined-data setting unit for setting the minimum number of digits of joined data that corresponds to the number of characters, specified by the number-of-characters specifying unit. The overlapped portion determining unit may still further comprise a comparing unit for comparing the minimum number of digits of joined data that is set by the number-of-digits of joined data setting unit with the total sum calculated by the total sum calculating unit. The overlapped portion determining unit may make the determination only when the total sum exceeds the minimum number of digits of joined data. A minimum number of characters of the overlapped portion can be made variable by making the number of synthesization digits variable. As a result of making variable the minimum number of characters of the overlapped portion in accordance with the set number of characters of the bar code, the data formed due to the misreading can be further prevented from mixed in the bright/dark patterns.

The number-of-digits-of-joined-data setting unit may set the minimum number of digits of joined data in substantially direct proportion to the number of characters, specified by the number-of-characters specifying unit. When the specified number of characters increases, there also rises a probability in which the same pattern might be mixed in the two bright/dark patterns by chance due to the misreading. Nevertheless, the misread data can be prevented from mixed in the bright/dark patterns by making a threshold value in substantially direct proportion to the number of characters.

The bar code reading apparatus according to the present invention may further comprise a number-of-effective-characters setting unit for setting the number of effective characters of the bright/dark pattern that corresponds to the number of characters, specified by the number-of-characters setting unit. The bar code reading apparatus may also comprise a discarding unit for discarding the bright/dark patterns having the number of characters that is smaller than the number of effective characters, set by the number-of-effective-characters setting means. With this construction, extremely short bright/dark patterns can be removed. The short bright/dark patterns are not superficially distinguishable from the misread data in some cases. Accordingly, the misread data can be restrained as much as possible by eliminating the above-mentioned short bright/dark patterns.

The number-of-effective-characters setting means desirably sets the number of effective characters in substantially direct proportion to the number of characters, specified by the number-of-characters specifying means. When the specified number of characters increases, there also rises such a possibility that the misread data might take superficially the same form as the bright/dark pattern. Hence, the misread data can be further prevented from mixed in the bright/dark pattern by setting the threshold value much higher.

The bar code reading apparatus according to the present invention may further comprise a threshold value setting unit for setting a threshold value of the number of characters of the overlapped portion that corresponds to the number of character, specified by the number-of-characters specifying unit. The bar code reading apparatus may also comprise a comparing unit for comparing the number of characters of the overlapped portion contained in each of the first bright/ dark pattern and the second bright/dark pattern with the threshold value. The bar code reading apparatus may still further comprise a determination reexecuting unit for causing the overlapped portion determining unit to make the determination with respect to the first bright/dark pattern and the second bright/dark pattern which are newly detected by the bright/dark pattern detecting unit when the number of characters of the overlapped portion is smaller than the threshold value. With the construction described above, if the number of characters of the overlapped portion is smaller than the threshold value, the overlapped portion determining unit is capable of making the determination by rereading the bright/dark pattern. Accordingly, even if there is the possibility of the misread data being mixed in the bright/dark pattern, the mixing thereof can be prevented. Moreover, the above threshold value is variable corresponding to the number of characters, set by the number-of-characters setting unit. It is therefore feasible to restrain the possibility of the mixing of the misread data as much as possible.

The threshold value setting unit desirably sets the threshold value for the number of characters in substantially direct proportion to the number of characters, specified by the number-of-characters specifying unit. When the set number of characters becomes larger, there must be a higher possibility that the characters contained in each bright/dark pattern might take the same form by chance. Hence, the misread data can be further prevented from mixed in by setting the threshold value much higher.

A method of reading a bar code according to the present invention comprises a scanning step, a detecting step, an overlapped portion determining step and a joining step. The scanning step scans a bar code interposed between a first bar and a second bar. The detecting step detects a bright/dark pattern along a scan trajectory thereof. The overlapped portion determining step determines whether an overlapped portion having the same content is contained in each of a first bright/dark pattern and a second bright/dark pattern when detecting the first bright/dark pattern along the scan trajectory that passes through not the second bar but the first bar, and the second bright/dark pattern along the scan trajectory that passes through not the first bar but the second bar. The joining step joins the first bright/dark pattern and the second bright/dark pattern when determining that the overlapped portion is contained in each of the first bright/ dark pattern and the second bright/dark pattern.

BRIEF DESCRIPTION OF THE DRAWINGS

Other objects and advantages of the present invention will become apparent during the following discussion in conjunction with the accompanying drawings, in which:

FIG. 8 is a diagram showing a minimum number-of-effective-data-digits table stored in an external RAM shown in FIG. 3;

FIG. 9 is a diagram illustrating a structure of a second code;

FIG. 10 is a diagram showing a scan direction in which the second code is read;

FIG. 14 is a diagram showing a number-of-digits-of-synthesized-data table stored in the external RAM shown in FIG. 3 in the second embodiment of the present invention.

DESCRIPTION OF THE PREFERRED EMBODIMENTS

Next, embodiments of the present invention will hereinafter be discussed with reference to the accompanying drawings.

First Embodiment (Principle of the Embodiment)

Figure 1:
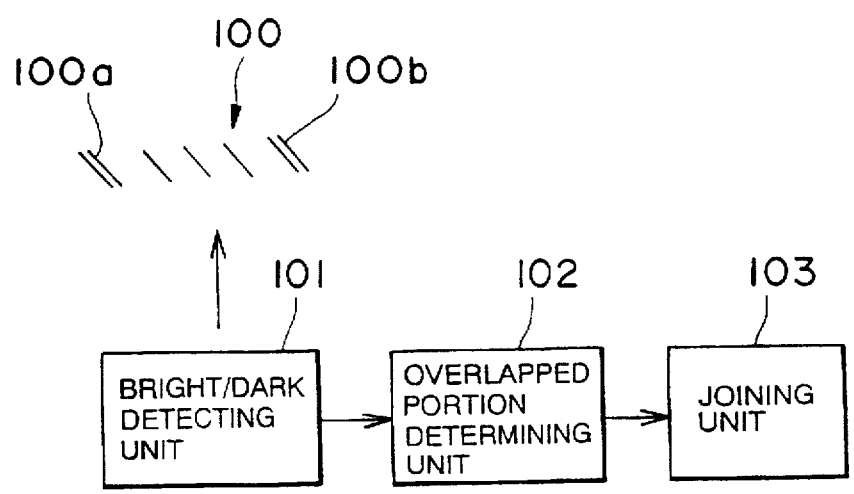
FIG. 1 is a diagram showing the principle of a first embodiment of the present invention.

FIG. 1 is a block diagram schematically showing the principle of a bar code detecting apparatus in a first embodiment of the present invention. Referring to FIG. 1, a bright/dark pattern detecting unit 101 scans a bar code 100 interposed between a first bar 100a and a second bar 100b, and detects a bright/dark pattern on a scan trajectory thereof. If the bright/dark pattern detecting unit 101 detects a first pattern on the scan trajectory that includes the first bar 100a but excludes the second bar 100b and a second bright/dark pattern on the scan trajectory that includes the second bar 100b but excludes the first bar 100a, an overlapped portion determining unit 102 determines whether an overlapped portion composed of the same data is contained in each of the first and second bright/dark patterns. When the overlapped portion determining unit 102 determines that the overlapped portion is contained in each of the first and second bright/dark patterns, a joining unit 103 joins the first and second bright/dark patterns. As a result, the first and second bright/dark patterns are joined only when the first and second bright/dark patterns are partially overlapped with each other. Misreading of the data can be thereby restrained as much as possible, and the read data corresponding to the entire bar code can be therefore synthesized based on those bright/dark patterns. Accordingly, the reading process of the bar code is completed in a short period of time without the scan direction corrected frequently.

(Whole Construction of Bar Code Detecting Apparatus)

Figure 2:
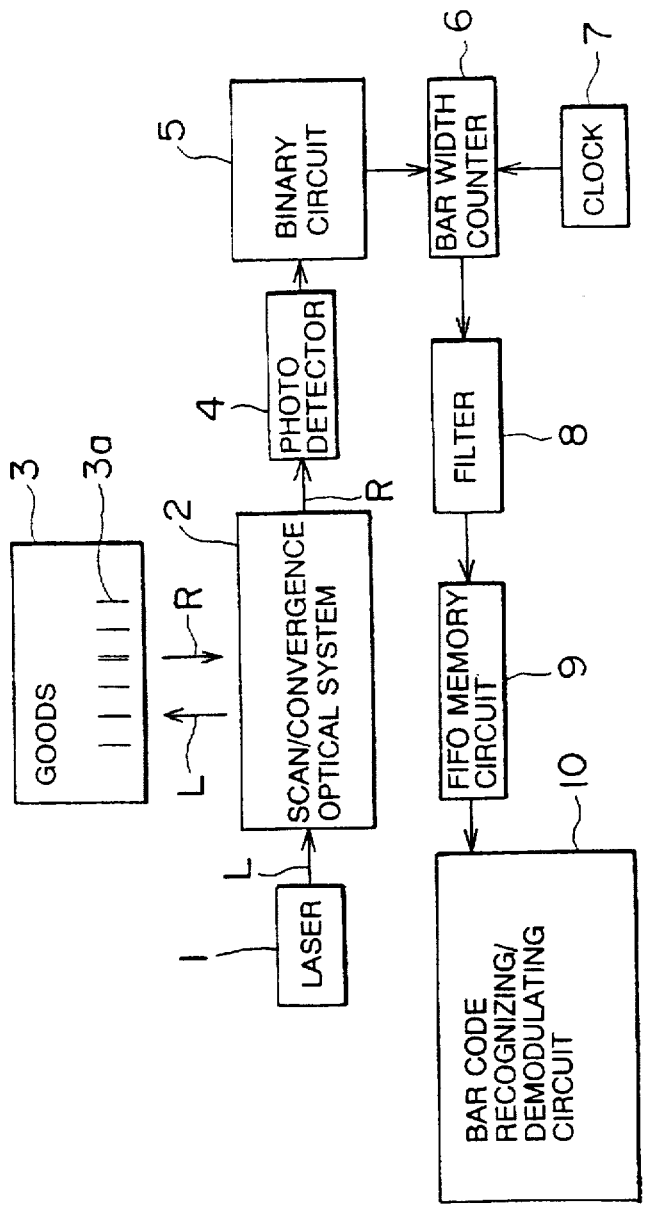
FIG. 2 is a block diagram illustrating a bar code reader in the first embodiment of the present invention.

FIG. 2 is a block diagram schematically illustrating a construction of the bar code reading apparatus in the first embodiment of the present invention. Referring to FIG. 2, a laser light source 1 is a semiconductor laser for emitting laser beams L. The laser beams L emitted from the laser light source 1 are incident upon a scan/convergence optical system 2. The scan/convergence optical system 2 deflects the laser beams L with a polygon mirror and reflects the thus deflected laser beams L in a variety of directions by use of a plurality of fixed mirrors. The scan/convergence optical system 2 performs scanning with the laser beams in the plurality of directions upward from this scan/convergence optical system 2 during a period (from a timing when the laser beams L start to be made incident on one reflection surface till a timing when the laser beams come off the same surface) of the deflection by one reflection surface of the polygon mirror. When the scanning laser beams L strike on the surface of a goods 3, the laser beams L are irregularly reflected from the surface, and some of reflected beams R return to the scan/convergence optical system 2. The scan/convergence optical system 2 relays the reflected beams R to a photo detector 4. The photo detector 4 is a photo diode covered with a filter that transmits only the light beams having the same wavelength as that of the laser beams L. The photo detector 4 inputs an electric current corresponding to an intensity of the reflected beams R to a binary circuit 5.

The binary circuit 5 converts a value of the electric current inputted from the photo detector 4 into a value of voltage. The binary circuit 5 then compares the converted voltage value with a predetermined threshold value to shape it into a square wave signal. This square wave signal indicates "H" level if an intensity of the reflected beams R corresponds to a reflectance of a white bar in a bar code 3a labeled on the goods 3. The square wave signal also indicates "L" level if the intensity of the reflected beams R corresponds to a reflectance of a black bar in the bar code 3a. The binary circuit 5 detects each of a rise (which is a white edge) and a fall (which is a black edge) of the square wave signal. The binary circuit 5 then outputs a white edge pulse (WEG) synchronizing with the white edge and also a black edge pulse (BEG) synchronizing with the black edge.

A bar width counter 6 measures a time from a timing of the white edge pulse (WEG) to a timing of the black edge pulse (BEG) (which is expected to be a time corresponding a width of the white bar in the bar code 3a). The bar width counter 6 also measures a time from the timing of the black edge pulse (BEG) to the timing of the white edge pulse (WEG) (which is expected to be a time corresponding a width of the black bar in the bar code 3a). Note that the bar width counter 6 counts the number of clocks from a clock 7 to measure the time corresponding to each of those bar widths and outputs count values corresponding to the bar widths.

A filter circuit 8 logically investigates each count value inputted from the bar width counter 6. The filter circuit 8 then eliminates the counter value exhibiting an intensity variation due to a factor obviously other than the reflected beams R from the bar code 3a, extracts only the count values with a high probability of showing the respective bar widths of the bar code 3a and transfer these count values to the next stage. A bright/dark pattern detecting unit, which scans the bar code 3a and detects a string of bright/dark patterns on the scan trajectory, is constructed of the laser light source 1, the scan/convergence optical system 2, the photo detector 4, the binary circuit 5, the bar with counter 6, the clock 7 and the filter circuit 8.

A FIFO memory circuit 9 is a first-in first-out memory for temporarily holding the count values passing through the filter circuit 8 and outputting the count values in order of the holding sequence. The FIFO memory circuit 9 functions as a buffer.

A bar code recognizing/demodulating circuit 10 is a processor for executing a predetermined recognition/demodulation program for the respective count values read from the FIFO memory circuit 9 and fetching various items of data modulated into the bar code.

Given next is a detailed explanation of configurations of the FIFO memory circuit 9 and the bar code recognizing/demodulating circuit among those constructive elements.
(FIFO Memory Circuit)

Figure 3:
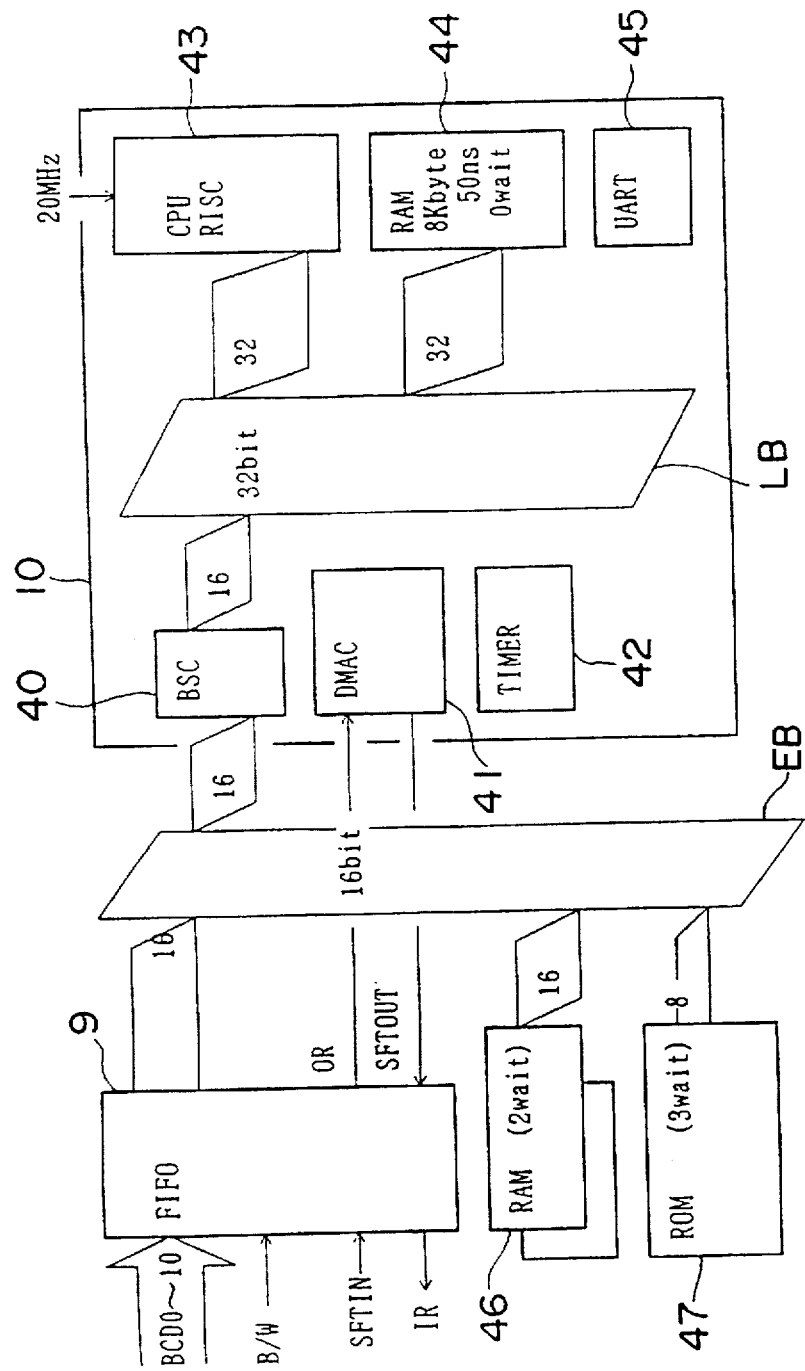
FIG. 3 is a block diagram illustrating detailed configurations of a FIFO memory circuit and of a bar code recognizing/demodulating circuit shown in FIG. 2.

FIG. 3 shows I/O signals of the FIFO memory circuit 9. Referring to FIG. 3, "BCD0–BCD10" represent count values (which are hereinafter referred to as "bar width count values") outputted from the filter circuit 8 and each indicating the bar width. Further, "B/W" indicates a color distinguishing signal, outputted from the filter circuit 8, for showing a bar color (white/black). Each of those signals is read by the FIFO memory circuit 9 when an SFTIN signal (indicating a switchover of the above signals) is transmitted from the filter circuit 8. Further, the FIFO memory circuit 9, upon reading this signal, transmits an input-ready signal (IR) toward the bar width counter 6.

The FIFO memory circuit 9 is connected via a 16-bit external bus EB to the bar code recognizing/demodulating circuit 10. Then, the FIFO memory circuit 9 outputs, to the bar code recognizing/demodulating circuit 10 via the external bus EB, the bar width count value and the color distinguishing signal that have been first read, and transmits an output-ready signal (OR) instructing the bar code recognizing/demodulating circuit 10 to take in those item of data to the circuit 10. Subsequently, when the bar code recognizing/demodulating circuit 10 notifies the FIFO memory circuit 9 of a signal (SETOUT) indicating that those signals have been taken in, the FIFO memory circuit 9 outputs a next bar count value and color distinguishing signal toward the bar code recognizing/demodulating circuit 10.

Note that an external RAM 46 and an external ROM 47 are also connected to the external bus EB for connecting the FIFO memory circuit 9 and the bar code recognizing/demodulating circuit 10. This external RAM 46 is a random access memory for temporarily storing the data transmitted from the FIFO memory circuit 9. The external ROM 47 is a read-only memory for storing programs shown in FIGS. 4 to 7 and a minimum number-of-effective-data-digits table shown in FIG. 8.
(Bar Code Recognizing/Demodulating Circuit)

Referring next to FIG. 3, an explanation of a configuration of the bar code recognizing/demodulating circuit 10 enters into particulars.

The bar code recognizing/demodulating circuit 10 comprises a CPU 43, a RAM 44, a universal asynchronous receiver/transmitter (UART) 45, a direct memory access controller (DMAC) 41 and a timer 42 that are connected to each other via a 32-bit local bus LB, and a bus state controller (BSC) 40 connected between the local bus LB and the external bus EB.

The CPU 43 composed of an RISC chip controls the whole bar code recognizing/demodulating circuit 10. Further, the CPU 43 executes bar code recognizing/demodulating processes shown in FIGS. 4 through 7 for the bar width count value and the color distinguishing signals transmitted from the FIFO memory circuit 9 with reference to the minimum number-of-effective-data-digits table shown in FIG. 8.

The bus state controller (BSC) 40 is an I/O interface for managing states of the local bus LB and of the external bus EB.

The direct memory access controller (DMAC) 41, upon receiving the output-ready signal (OR) from the FIFO memory circuit 9, controls the bus state controller 40 to transfer the bar width count value and the color distinguishing signals that have been transmitted from the FIFO memory circuit 9 to the CPU 43. Upon a completion of this transfer, the direct memory access controller (DMAC) 41 notifies the FIFO memory circuit 9 of the signal (SETOUT) indicating that the signals have been taken in.

The timer 42 generates pieces of time data used for a variety of processes within the bar code recognizing/ demodulating circuit 10.

The universal asynchronous receiver/transmitter (UART) 45 is a parallel/serial interface converting the character data demodulated as parallel data into a serial signal and outputting the serial signal to the outside through an RS-232C port (which is not shown).

Next, the bar code recognition/demodulation processing program executed by the CPU 43 will be described with reference to flowcharts of FIGS. 4 through 7. The processing in the flowchart of FIG. 4 starts with switching ON a main power supply of the bar code reading apparatus. Then, initialization is carried out in first step S001. More specifically, there is set the number of digits of characters constituting the bar code to be read by the bar coder reading apparatus (which is number of digits of data to be read) in accordance with set state of an unillustrated dual in-line package switch (DIP switch).

In next step S002, the oldest data string (which corresponds to a series of count values and color distinguishing signal string or a bright/dark pattern which have been read by one-directional bar code scanning) stored in the external RAM 46 is picked up and it is checked whether a start bar (which is defined as a first bar) is contained in the data string. When the start bar is detected as a result of this checking, there is a high probability that the data string is based on the reflected beams from the bar code, and then the processing proceeds to step S004. Whereas if the start bar is not detected, whether the same data string contains the end bar (which is defined as second bar) is checked in step S003. Then, if the end bar is detected, there is the high probability that this data string is based on the reflected beams from the bar code, and the processing goes forward to step S004. In contrast with this, if not detected, the data string is regarded as based on the reflected beams from portions exclusive of the bar code, this data string is discarded and the processing returns to step S002.

Checked in step S004 is whether a length of the character adjacent to the bar (which is the start bar when the processing enters directly into step S004 from step S002 or with the end bar when entering step S004 via step S003) satisfies predetermined bar code standard conditions. Then, if the length of this character does not satisfy the predetermined standard conditions, the data string is conceived as the one based on the reflection beams from the portion excluding the bar code, and this data string is discarded. Then, the processing returns to step S002.

Contrastingly, if the length of the character satisfies the predetermined standard conditions, the same character is converted into data corresponding thereto (which corresponds to a data converting unit for segmenting the bright/ dark pattern per character and converting it into data in other format corresponding thereto) in step S005.

Checked in next step 006 is whether a length of the character adjacent to the character which is converted into the data in step S005 satisfies the predetermined bar code standard conditions. Then, if the length of this character does not satisfy the predetermined standard conditions, the processing proceeds to step S009.

Contrastingly, if the length of the character satisfies the predetermined standard conditions, the same character is converted into data corresponding thereto (which corresponds to the data converting unit) in step S007. Whether the data demodulation in step S005 or S007 is performed well is checked in next step S008. Then, if it is ill demodulated, the processing proceeds to step S009. If it is well demodulated, the processing proceeds to step S011.

Checked further in step S011 is whether the adjacent character is the end bar or not. Then, if this character does not meet the configuration of the end bar, the same character is conceived not to be the end bar, and the processing returns to step S006. If the adjacent character meets the configuration of the end bar, the bar code has been read without stopping by a continuous reading, and the processing proceeds to step S012.

In step S009, the minimum number-of-effective-data-digits table shown in FIG. 8 is referred based on the number of digits of data to be read set in step S001, and a "minimum number of effective data digits" corresponding thereto is read (which corresponds to a number-of-effective-character-digits setting unit). The "minimum number of effective data digits" indicates a minimum length (which is the number of character digits) required for treating each demodulated data string as effective one when the demodulated data corresponding to the whole bar code is synthesized on the basis of the two demodulated data strings. Note that the process of, as shown in FIGS. 10A and 10B, dividing the bar code into the two data strings and thus reading them is called "dividedly reading".

Figure 11:
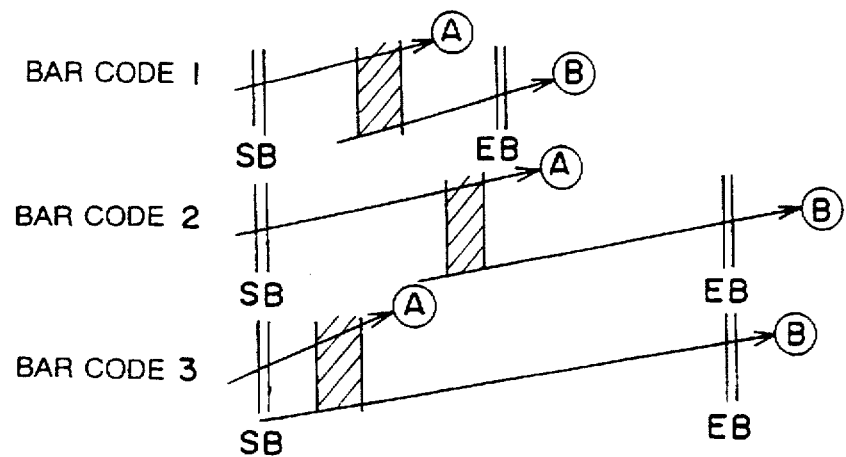
FIG. 11 is an explanatory diagram showing a relationship between the number of digits of data to be read and minimum number of effective data digits.

In the minimum number-of-effective-data-digits table shown in FIG. 8, the data are arranged to increase or decrease the minimum number of effective data digits in substantially direct proportion to a magnitude of the number of digits of data to be read (which is the number of digits of the whole bar code). This arrangement is intended to eliminate the misread data and to synthesize the bar code from only the demodulated data strings exhibiting the high probability of being caused by the reflected beams from the bar code. FIG. 11 shows examples of data strings A and B obtained by split-reading the bar codes. Each of the data strings A and B for the bar code 1 and 2 is obtained by reading more than ⅓ of the bar code, and hence there is a small probability that the data strings is based on the light beams from the portions other than the bar code and takes the same form as that based on the light beams from the bar code by chance. Contrastingly, the data string A in the bar code 3 is less than ⅓ of the bar code, and hence there is a high probability that the data strings based on the light beams from the portions exclusive of the bar code happen to take the same form as that based on the light beams from the bar code. Then, the data are arranged to increase or decrease the minimum number of effective data digits in accordance with the number of digits of data to be read in order to remove the data strings exhibiting the high probability that is based on the light beams from the portions other than the bar code and takes the same form as that based on the light beams from the bar code by chance.

Checked in next step S010 is whether the number of digits (which is the number of characters) of the demodulated data string consisting of the characters demodulated up to now is larger than the "minimum number of effective data digits" read in step S009. Then, if the number of digits (which is the number of characters) of the demodulated data string is under the minimum number of effective data digits, the same demodulated data string is discarded to prevent the data from being misread, and the processing returns to step S002 (which corresponds to a disposal unit for disposing of the bright/dark pattern composed of the characters the number of which is less than the number of effective characters). Contrastingly, if the number of digits (which is the number of characters) of the demodulated data string is larger than the minimum number of effective data digits, there must be a high probability that this demodulated data string is obtained by dividedly reading the bar code, and the processing proceeds to step S012.

Figure 5:
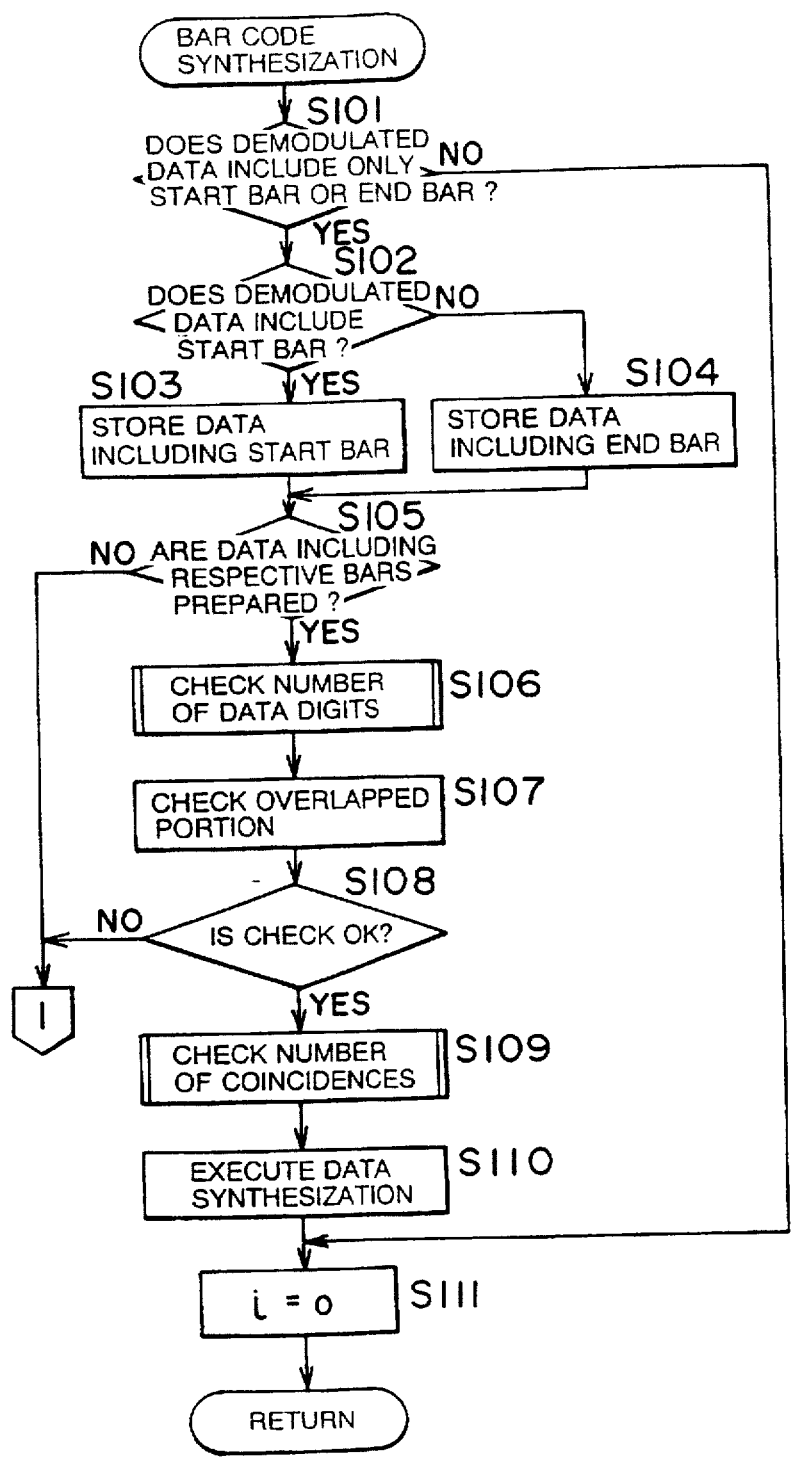
FIG. 5 is a flowchart showing a bar code synthesization subroutine executed in step S012 shown in FIG. 4.

In step S012, a bar code synthesizing process subroutine shown in FIG. 5 is executed. Checked in first step S101 of the subroutine shown in FIG. 5 is whether the demodulated data string to be processed in step S012 is based on the a data string obtained by such scanning as to pass over only one of the start and end bars. Then, if the demodulated data string to be processed in step S012 is based on the data string obtained by such scanning as to pass over both of the start and end bars, the bar code is read without stopping by the continuous reading. Therefore, a variable i is reset to "0" in step S111, and this subroutine is terminated.

On the contrary, if the demodulated data string to be processed in step S012 is based on the data string obtained by such scanning as to pass over only one of the start and end bars, it is checked in step S102 whether the same demodulated data string is based on the data string obtained such scanning as pass over the start bar. Then, if the same demodulated data string is based on the data string by such scanning as to pass over the start bar, the RAM 44 is stored with the demodulated data string (which is defined as a first bright/dark pattern) containing the start bar in step S103. On the other hand, if the demodulated data string is based on the data string by such scanning as to pass over the end bar, the RAM 44 is stored with the demodulated data string (which is defined as a second bright/dark pattern) containing the end bar in step S104.

In any case, whether there are prepared the demodulated data string containing the start bar and the data string with containing the end bar is checked in next step S105. If the data strings with the respective bars are not yet prepared, the processing returns to step S002, and the demodulating process for the next data string is executed.

Figure 6:
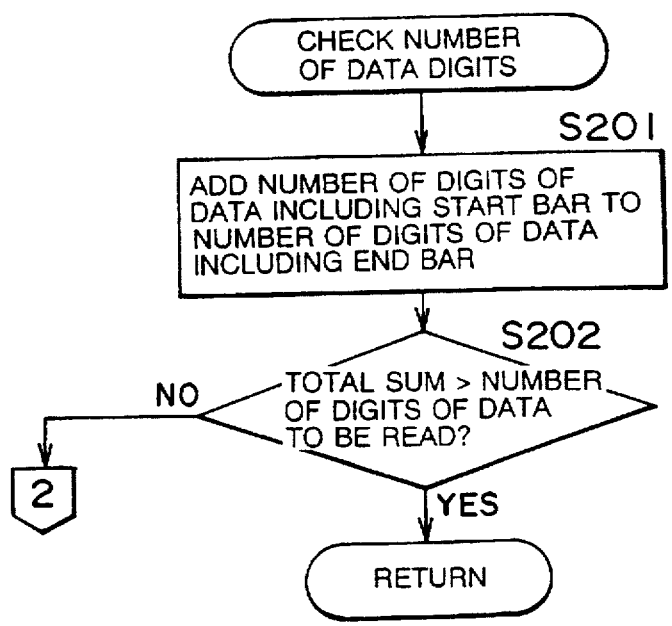
FIG. 6 is a flowchart showing a number-of-data-digits check subroutine executed in step S106 shown in FIG. 5.

In contrast with this, if the data strings with the respective bars are prepared, a number-of-data-digits check subroutine shown in FIG. 6 is executed in step S106. Added up in first step S201 of this number-of-data-digits check subroutine are the number of digits (which is the number of characters) of the demodulated data string containing the start bar and the number of digits (which is the number of characters) of the demodulated data string containing the end bar (which corresponds to a total sum calculating unit). It is checked in next step S202 whether the total sum of the numbers of digits of the demodulated data strings that are added up in step S201 exceeds the number of digits of read data set in step S001 (which corresponds to a comparing unit). Then, if this total sum is under the number of digits of data to be read, it is probably conceived that there is no overlapped portion of those data strings at all. Accordingly, this shows no such assurance that the two demodulated data strings are based on the same bar codes. The processing consequently returns to step S002 to eliminate the misreading of the data and the demodulation process is executed on the next data string stored in the RAM 44. On the contrary, if the total sum exceeds the number of digits of data to be read, there must be a high probability that the demodulated data strings are overlapped with each other. Hence, the number-of-data-digits check subroutine comes to an end, and the processing returns to step S106 shown in FIG. 5.

The overlapped portion of the two demodulated data strings is checked in step S107 carried out next to step S106. Therein, the overlapped portion is a part of data contained in both of the two data strings, as illustrated by oblique lines in FIG. 11. Checked herein is whether a content of a tail end of the demodulated data containing the start bar is coincident with a content of a head of the demodulated data string containing the end bar. Note that the number of digits (which is the number of characters) of the overlapped portion is equal to a numeric value obtained by subtracting the number of digits of data to be read from the total sum of the numbers of digits of the two demodulated data strings. If no overlapped portion can be seen as a result of the checking, or if the number of digits of the overlapped portion does not coincide with the numeric value obtained by subtracting the number of digits of data to be read from the total sum of the numbers of digits of the two demodulated data strings, it is highly probable that the data exclusive of the demodulated data based on the same bar code are mixed in, and the processing returns to step S002 from step S108. Executed therein is the demodulation process on other data string in replace of the data strings stored at present in the RAM 44. Contrastingly, if the number of digits of the overlapped portion coincides with the numeric value obtained by subtracting the number of digits of data to be read from the total sum of the numbers of digits of the two data strings, the processing proceeds to step S109. That is, the processes of steps S106 to S108 correspond to those of an overlapped portion determining unit for determining whether the overlapped portion consisting of the same data is included in each of the first and second bright/dark patterns.

Figure 7:
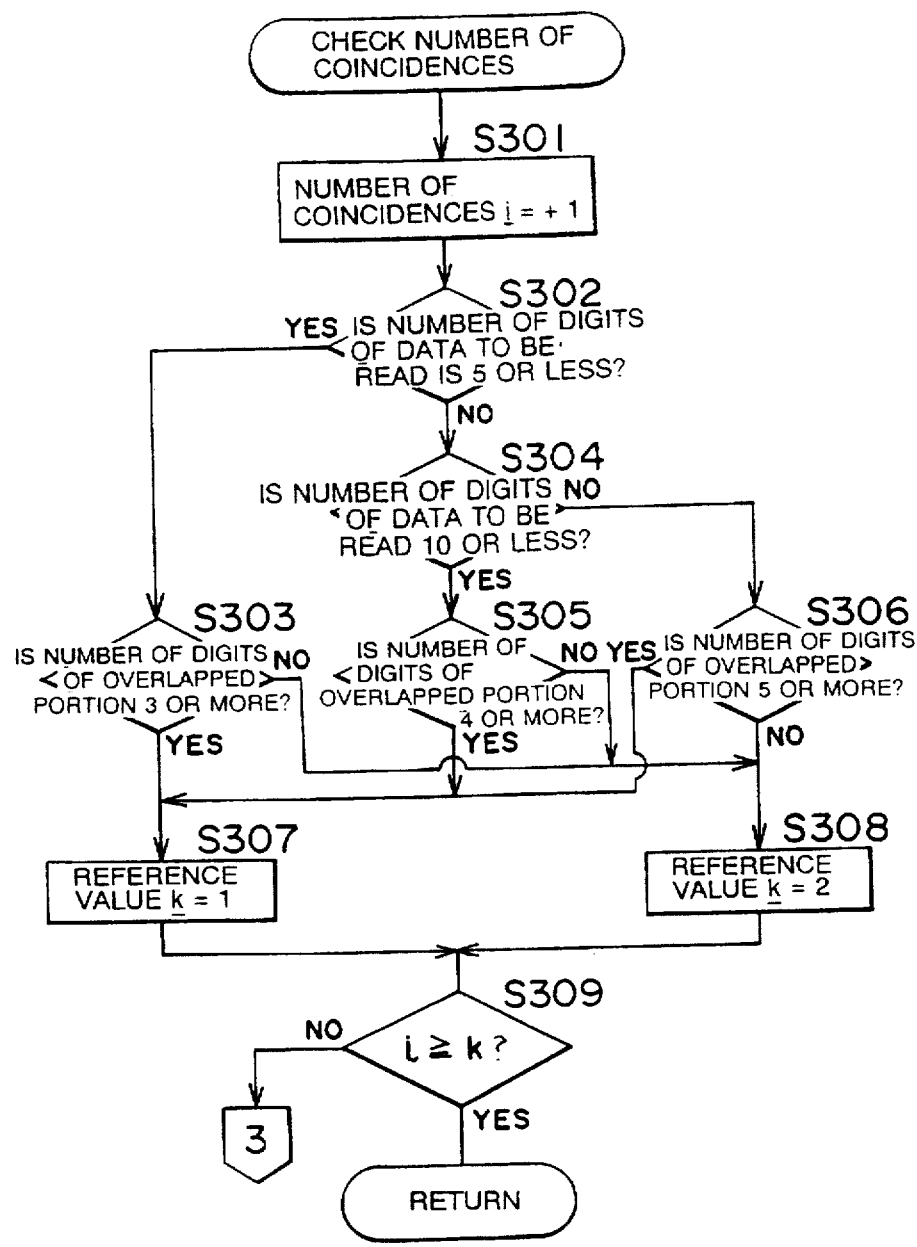
FIG. 7 is a flowchart showing a number-of coincidences check subroutine executed in step S109 shown in FIG. 5.

In step S109, a number-of-coincidences check subroutine shown in FIG. 7 is executed. This number-of-coincidences check subroutine is the processing for making the number of confirmation that the data of the overlapped portions are coincident with each other as a condition of data synthesization variable in accordance with the number of digits (which is the number of characters) of data to be read and the number of digits of the overlapped portion. More specifically, the bar codes 1 and 2 illustrated in FIG. 12 have a difference in terms of their numbers of digits, and hence a difference is produced in proportions of the overlapped portions to the number of digits of data to be read. Then, if the proportion of the overlapped portion to the number of digits of data to be read is small as in the case of the bar code 2, there must be a high possibility that both of the overlapped portions of the two demodulated data strings are produced due to the misreading. Then, in such a case, the fact that the demodulation of read data is re-executed and that the coincidence of data of the overlapped portions is re-confirmed is made a condition for synthesization of demodulation data. Similarly, the bar codes 2 and 3 illustrated in FIG. 12 have a difference in terms of their numbers of digits of the overlapped portions, and hence a difference is produced in proportions of the overlapped portions to the number of digits of data to be read. Then, if the proportion of the overlapped portion to the number of digits of data to be read is large as in the case of the bar code 3, there must be a small possibility that both of the overlapped portions of the two demodulated data strings are produced due to the misreading. Then, in such a case, the fact that the coincidence of data of the overlapped portions is confirmed in this time is the only condition for synthesization of demodulated data.

In first step S301 after entering the number-of-coincidences check subroutine, the variable i indicating the number of coincidences of the overlapped portions is incremented by 1. Note that an initial value of this variable i is "0".

In next step S302, whether the number of digits of data to be read is 5 or less (which corresponds to a threshold value setting unit). Then, if it is 5 or less whether the number of digits of the overlapped portion is 3 or more is checked in step S303 (which corresponds to the comparing unit). If the number of digits of the overlapped portion is 3 or more as a result of this checking, the processing proceeds to step S307. If it is less than 3, the processing proceeds to step S308.

In contrast with this, when it is determined that the number of digit s of data to be read is more than 5, whether the number of digits of data to be read is 10 or less is checked in step S304 (which corresponds to the threshold value setting unit). Then, if it is 10 or less, whether the number of digits of the overlapped portion is 4 or more is checked in step S305 (which corresponds to the comparing unit). If the number of digits of the overlapped portion is 4 or more as a result of the above checking, the processing proceeds to step S307. If it is less than 4, the processing proceeds to step S308. On the other hand, if the number of digits of data to be read is more than 10, whether the number of digits of the overlapped portion is 5 or more is checked in step S306 (which corresponds to the comparing unit). If the number of digits of the overlapped portion is 5 or more as a consequence of this checking, the processing proceeds to step S307. If it is less than 5, the processing proceeds to step S308.

A reference value k is set to "1" in step S307. On the other hand, the reference value k is set to "2" in step S308. In any case, the number-of-coincidences i at the present time is compared with the reference value k in next step S309. Subsequently, if the number-of-coincidences i is less than the reference value k, the CPU 43 sets the processing back to step S002 to demodulate read data and to confirm coincidence of data of overlapped portions of data strings once again. In this case, the CPU 43 clears the data strings stored in the RAM 44 at the present time while holding the value of the variable i and stores the RAM 44 with the newly demodulated data string (which corresponds to a determination reexecuting unit for making the overlapped portion determining unit execute the determination about the first and second bright/dark patterns newly detected by the bright/dark pattern detecting unit). Contrastingly, if the number-of-coincidences i is equal to or more than the reference value k, the CPU 43 confirms that the data of overlapped portions are not formed due to the misreading and assumes that the possibility of the misreading is reduced. Then, the number-of-coincidences check subroutine is terminated, thus the process returns to the routine shown in FIG. 5. According to a flow of processes shown in FIG. 7, the greater number of digits of data to be read becomes, the larger number of digits of the overlapped portion at the time when one time of confirmation of the coincidence of the overlapped portions is the only condition for the synthesization becomes.

In the bar code synthesization subroutine shown in FIG. 5 to which the processing is returned, synthesization of the demodulated data strings is implemented in step S110 executed after step S109. More specifically, a portion subsequent to the overlapped portion in the demodulated data string containing the end bar is joined to the overlapped portion in the demodulated data string containing the start bar. A series of demodulated data strings corresponding to the entire bar code are thereby synthesized (which corresponds to a joining unit for joining the first and second bright/dark patterns). The thus synthesized demodulated data string has the same structure as that of the demodulated data string based on the data read without stopping by the continuous reading.

In next step S111, since the synthesization of a demodulated data string corresponding to a single set of bar code is completed, the variable i is set to "0" in preparation for reading a next bar code. Thereafter, the bar code synthesization subroutine is finished, and the processing returns to the processes shown in FIG. 4.

Figure 4:
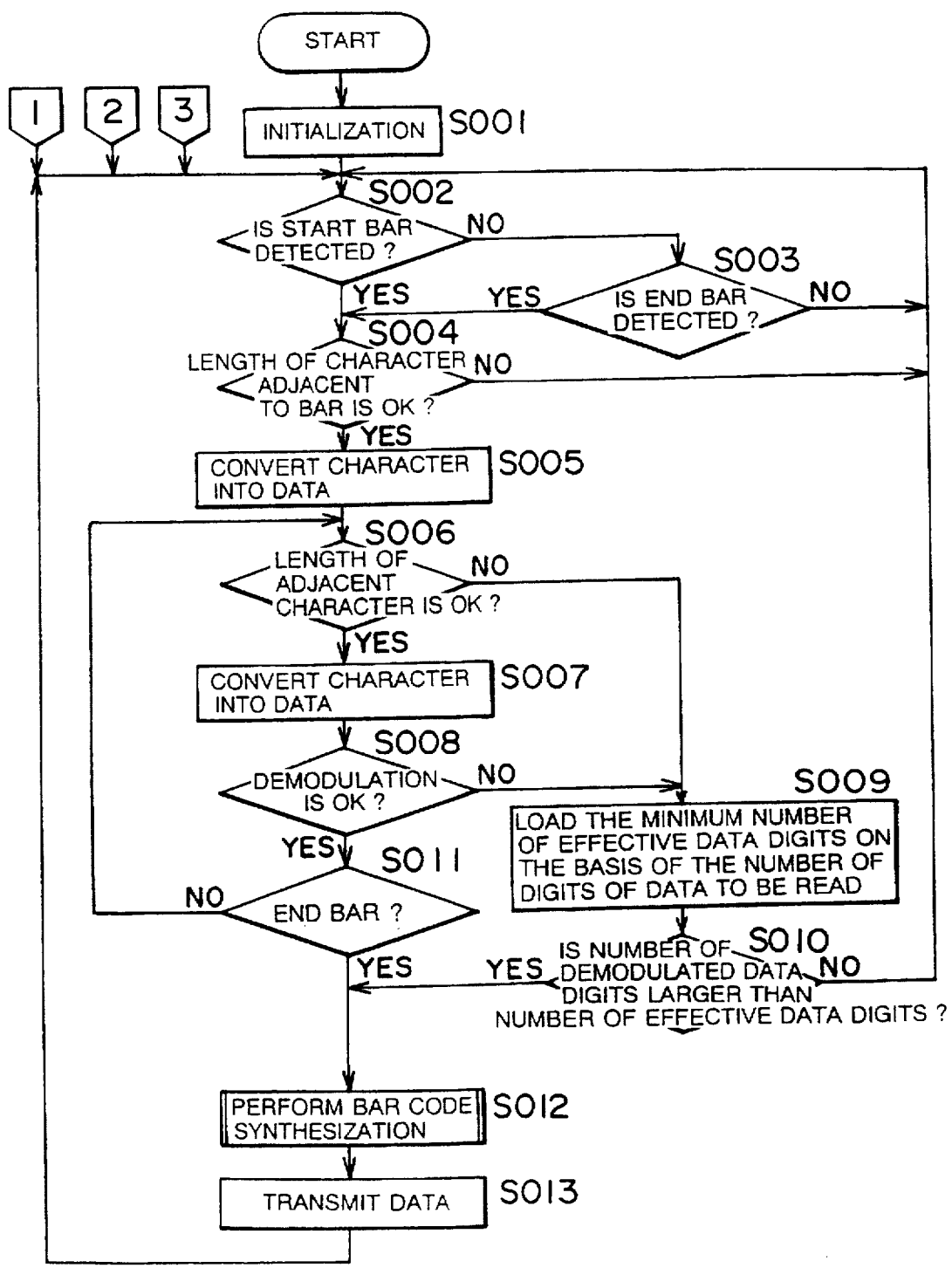
FIG. 4 is a flowchart showing a bar code recognition/ demodulation processing program executed by a CPU shown in FIG. 3.

In the main routine shown in FIG. 4 to which the processing is returned, the data transmission is executed in step S013 executed after step S012. To be more specific, the demodulated data string (which is the demodulated data string read without stopping by the continuous reading, or the demodulated data string synthesized in step S012) stored in the RAM 44 is transmitted via the universal synchronous receiver/transmitter (UART) 45 to the outside. Then, the processing returns to step S002 to read the next bar code.

According to the thus constructed bar code reading apparatus in this embodiment, even the demodulated data strings based on dividedly read data that can not be conceived immediately as the demodulated data strings based on the bar code because of containing only one of the start and end bars (steps S202 and S108) can be synthesized as the series of demodulated data string corresponding to one set of bar code, when the contents of the overlapped portions of the demodulated data strings are determined to coincide with each other. The above overlapped portions can be easily extracted simply by specifying the number of digits of data of the bar code to be read, and calculating the total sum of the numbers of digits of the dividedly read data strings.

Further, each demodulated data string based on dividedly read data (containing only one of the start and end bars) is previously subjected to the selection based on the minimum number of effective data digits (step S010), and hence only the one having the number of digits that is equal to or more than the minimum number of effective digits. The misread data based on the reflected beam from the portion other than the bar code is hardly mixed therein. Note that the minimum number of effective data digits is determined in substantially direct proportion to the number of digits of data to be read (step S009). The data are synthesized from only the demodulated data strings with a sufficient reliability in relative relationship with the number of digits of the bar code.

Moreover, the number of confirmation of the coincidence of overlapped portions of dividedly read data strings needed for synthesizing the data varies corresponding to the number of digits of data to be read and the number of digits of the overlapped portion (step S309). That is, when compared in the case of the same number of digits of the overlapped portion, and if the number of digits of data to be read increases, the number of confirmation required for the data synthesization rises. Further, when compared in the case of the same number of digits of data to be read, and if the number of digits of the overlapped portion decreases, the number of the confirmation needed for the data synthesization increases and becomes 2. Thus, the reliability on the data synthesization is enhanced by making variable the number of checking processes corresponding to the relative relationship between the number of digits of data to be read and the number of digits of the overlapped portion. Hence, the misread data based on the reflected beam from the portion exclusive of the bar code is hardly mixed therein.

Second Embodiment

In accordance with the first embodiment, the requirement is that the total sum of numbers of digits of the two split-reading demodulated data strings exceeds the number of digits of data to be read irrespective of the magnitude of the number of read digits (step S202). Accordingly, the number-of-data-digits checking shown in FIG. 6 is passed on condition that the number of digits of the overlapped portion is at least 1. Then, the number of confirmation of the coincidences of the content of the overlapped portions that are required for the data synthesization is made variable corresponding to the number of digits of the same overlapped portions in ex post facto manner in the checking of the number of coincidences shown in FIG. 7.

In accordance with a second embodiment is characterized by the number of digits needed for the overlapped portion made variable.

FIG. 14 shows a number-of-digits-of-synthesized-data table stored in the external ROM 47 (see FIG. 3) in the second embodiment. As obvious from FIG. 14, when the number of digits of data to be read increases, the "number of digits of synthesized data" rises in substantially direct proportion thereto. This "number of digit of synthesized data" determines a lower limit value of the total sum of the number of digits of the demodulated data string containing the start bar and the number of digits of the demodulated data string containing the end bar. Accordingly, when the number of digits of data to be read increases, the number of digits of the overlapped portion rises in substantially proportion thereto.

Figure 13:
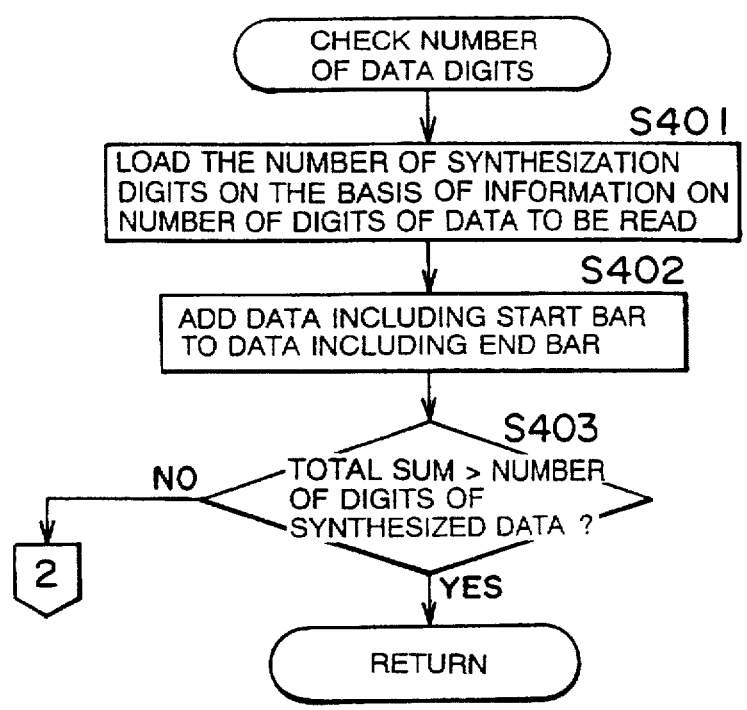
FIG. 13 is a flowchart showing a number-of-data-digits check subroutine executed in step S106 shown in FIG. 5 in a second embodiment of the present invention.
Figure 15:
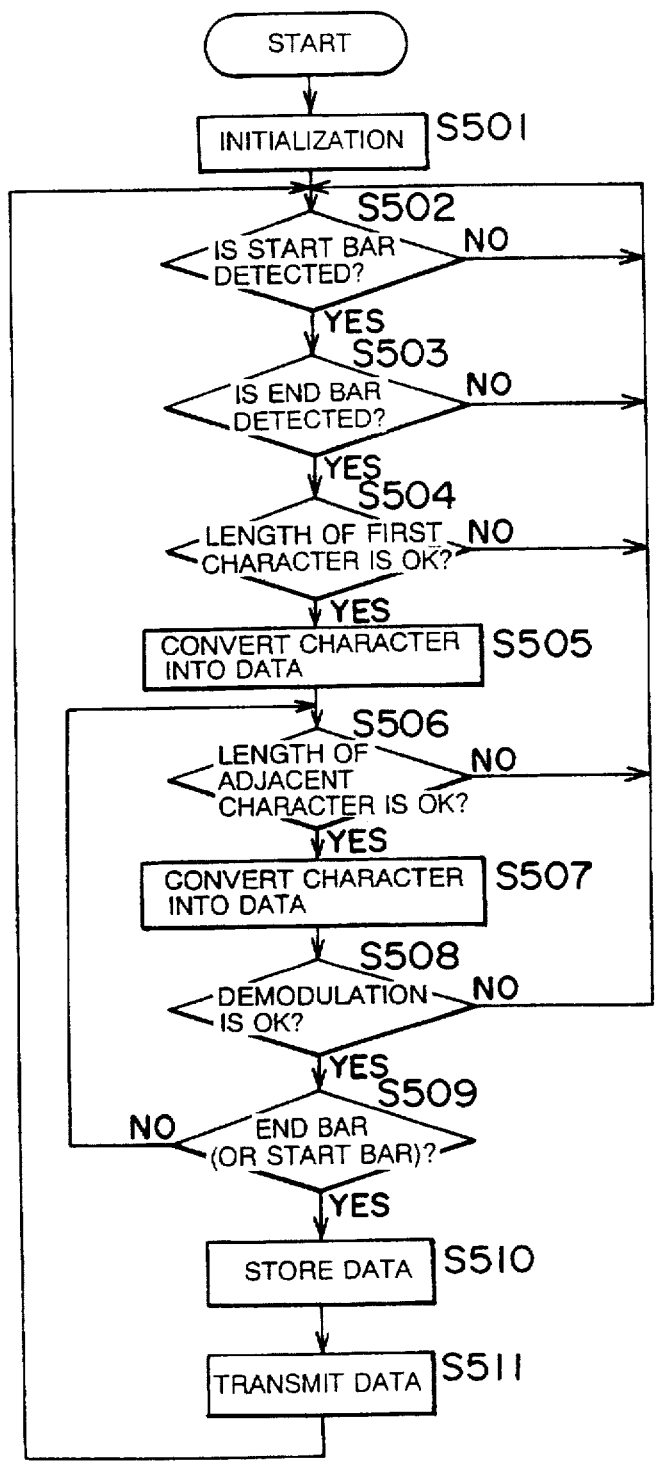
FIG. 15 is a flowchart showing a bar code recognition/ demodulation processing program executed by a conventional bar code reader.

FIG. 13 is a flowchart showing a number-of-data-digits check subroutine executed in step S106 shown in FIG. 5 to check the number of digits of the overlapped portion by referring to the number-of-digit-of-synthesized-data table. The flowchart shown in FIG. 13 corresponds to the flowchart shown in FIG. 6 in the first embodiment. In first step S401 after entering the number-of-data-digits check subroutine, an item of number-of-digit-of-synthesized-data corresponding to the number of digits of data to be read is read from the number-of-digit-of-synthesized-data table shown in FIG. 14 on the basis of the number of digits of data to be read that is set in step S001 (which corresponds to a number-of-digit-of-synthesized-data setting unit).

Added up in next step S402 are the number of digits (which is the number of characters) of the demodulated data string containing the start bar and the number of digits (which is the number of characters) of the demodulated data string containing the end bar (which corresponds to the total sum calculating unit). It is checked in next step S403 whether the total sum added up in step S402 exceeds the number of digits of synthesized data that is read in step S401 (which corresponds to the comparing unit). Then, if this total sum is equal to or less than the number of digits of data to be read, there is absolutely no overlapped portion of the data strings, or alternatively there must be an insufficient number of digits of the overlapped portion as compared with the number of digits of data to be read. Accordingly, even if the data of the overlapped portions are coincident with each other, it can not be denied that this coincidence might be produced by chance. The processing is therefore returned to step S002 to eliminate the misread data and to execute the demodulation processing on the next data string. In contrast with the above-mentioned, if the total sum exceeds the number of synthesized digits, each of the overlapped portions have the number of digits enough not to be made coincident with each other by chance. Consequently, the number-of-data-digit check subroutine is terminated, and the processing returns to step S106 shown in FIG. 5.

Figure 12:
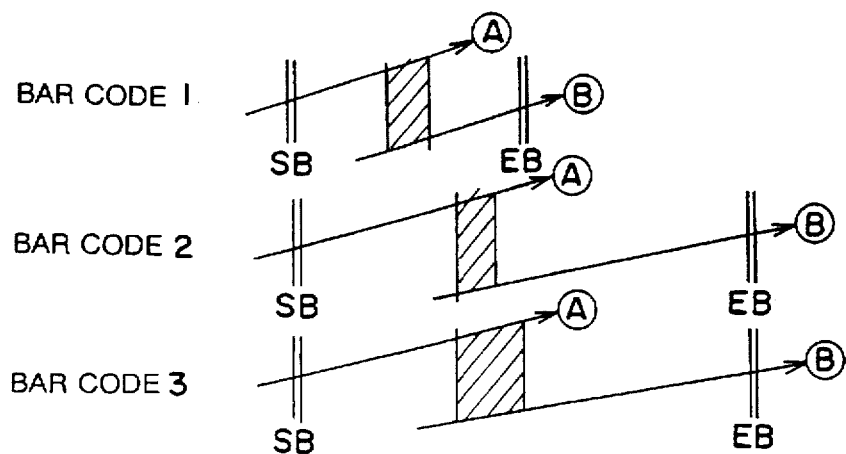
FIG. 12 is an explanatory diagram showing a relationship between the number of digits of data to be read and the number of digits of an overlapped portion.

Thus, in accordance with the second embodiment, the number of digits necessary for the overlapped portion varies corresponding to the number of digits of data to be read (step S401). Hence, the data are synthesized from the data strings with the reliability in the relative relationship with the number of digits of the bar code. Namely, the bar codes 1 and 2 illustrated in FIG. 12 are different in terms of the number of digits of the whole bar code even if the numbers of the digits of the overlapped portions are the same, with the result that the proportion of the overlapped portion to the whole bar code differs between the bar codes. That is, the proportion of the overlapped portion in the bar code 2 is smaller than the proportion of the overlapped portion in the bar code 1. Even if the bar code 1 has no misread data, there is a high possibility that the data strings of the overlapped portions in the bar code 2 might coincide with each other by chance. Then, in such a case, the prevention of the data strings of the overlapped portions from coinciding with each other by chance involves increasing the number of digits required for the overlapped portion as shown in the bar code 3.

Other hardware structures and processing in the second embodiment are the same as those in the first embodiment, and their explanations are therefore omitted herein.

According to the thus constructed bar code reading apparatus and method of the present invention, the first bright/dark pattern including the first bar but excluding the second bar is joined to the second bright/dark pattern including the second bar but excluding the first bar only when these two patterns include the overlapped portions composed of the same data. As a result, the misreading of the data can be restrained as much as possible, and it is therefore feasible to synthesize the read data corresponding to the whole bar code on the basis of those data strings. It is also accordingly possible to complete the reading of the bar code in a short period of time without entailing the frequent correction of the scan direction.

A wide range of different working modes can be formed based on the present invention without deviating from the spirit and scope of the present invention. The present invention, therefore, is not restricted by its specific working modes except being limited by the appended charges.

The present invention is not limited to the embodiments, described above, but also encompasses variations thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be restored to, falling within the scope of the invention.

What is claimed is:

1. An apparatus for reading a bar code, comprising:
   bright/dark pattern detecting means for scanning a bar code interposed between a first bar and a second bar and detecting a bright/dark pattern along a scan trajectory thereof;
   overlapped portion determining means for determining whether an overlapped portion having the same content is contained in each of a first bright/dark pattern and a second bright/dark pattern when said bright/dark pattern detecting means detects the first bright/dark pattern along the scan trajectory that passes through not the second bar but the first bar, and the second bright/dark pattern along the scan trajectory that passes through not the first bar but the second bar;

joining means for joining the first bright/dark pattern and the second bright/dark pattern when said overlapped portion determining means determines that the overlapped portion is contained in each of the first bright/dark pattern and the second bright/dark pattern; and number-of-characters specifying means for specifying the number of characters of the bar code to be read, wherein said overlapped portion determining means comprises:

total sum calculating means for calculating a total sum of the number of characters of the first bright/dark pattern and the number of characters of the second bright/dark pattern;

number-of-digits-of-joined-data setting means for setting the minimum number of digits of joined data that corresponds to the number of characters, specified by said number-of-characters specifying means; and comparing means for comparing the minimum number of digits of joined data that is set by said number-of-digits-of-joined data setting means with the total sum calculated by said total sum calculating means, and wherein said overlapped portion determining means makes the determination only when the total sum exceeds the minimum number of digits of joined data.

2. An apparatus for reading a bar code according to claim 1, wherein said number-of-digits-of-joined-data setting means sets the minimum number of digits of joined data in substantially direct proportion to the number of characters, specified by said number-of-characters specifying means.

3. An apparatus for reading a bar code according to claim 1, further comprising:

number-of-effective-characters setting means for setting the number of effective characters of the bright/dark pattern that corresponds to the number of characters, specified by said number-of-characters setting means; and discarding means for discarding the bright/dark patterns having the number of characters that is smaller than the number of effective characters, set by said number-of-effective-characters setting means.

4. An apparatus for reading a bar code according to claim 3, wherein said number-of-effective-characters setting means sets the number of effective characters in substantially direct proportion to the number of characters, specified by said number-of-characters specifying means.

5. An apparatus for reading a bar code according to claim 1, further comprising:

threshold value setting means for setting a threshold value of the number of characters of the overlapped portion that corresponds to the number of character, specified by said number-of-characters specifying means;

comparing means for comparing the number of characters of the overlapped portion contained in each of the first bright/dark pattern and the second bright/dark pattern with the threshold value; and determination reexecuting means for causing said overlapped portion determining means to make the determination with respect to the first bright/dark pattern and the second bright/dark pattern which are newly detected by said bright/dark pattern detecting means when the number of characters of the overlapped portion is smaller than the threshold value.

6. An apparatus for reading a bar code according to claim 5, wherein said threshold value setting means sets the threshold value for the number of characters in direct proportion to the number of characters, specified by said number-of-characters specifying means.

7. A method of reading a bar code, the method comprising steps of:

scanning a bar code interposed between a first bar and a second bar;

detecting a bright/dark pattern along a scan trajectory thereof;

determining whether an overlapped portion having the same content is contained in each of a first bright/dark pattern and a second bright/dark pattern when detecting the first bright/dark pattern along the scan trajectory that passes through not the second bar but the first bar, and the second bright/dark pattern along the scan trajectory that passes through not the first bar but the second bar; joining the first bright/dark pattern and the second bright/dark pattern when determining that the overlapped portion is contained in each of the first bright/dark pattern and the second bright/dark pattern; and specifying the number of characters of the bar code to be read, wherein said overlapped determining step comprises the steps of:

calculating a total sum of the number of characters of the first bright/dark pattern and the number of characters of the second bright/dark pattern, setting the minimum number of digits of joined data that corresponds to the number of characters, specified by said number-of-characters specifying step, and comparing the minimum number of digits of Joined data that is set by said number-of-digits-of-joined data setting means with the total sum calculated by said total sum calculating means, and wherein said overlapped determining step makes the determination only when the total sum exceeds the minimum number of digits of joined data.

8. An apparatus for reading a bar code, comprising:

bright/dark pattern detecting means for scanning a bar code interposed between a first bar and a second bar and detecting a bright/dark pattern along a scan trajectory thereof;

overlapped portion checking means for checking an overlapped portion having the same content contained in each of a first bright/dark pattern and a second bright/dark pattern, said first bright/dark pattern being detected by said bright/dark pattern detecting means scanning the bar code along a scan trajectory that passes through not the second bar but the first bar, said second bright/dark pattern being detected by said bright/dark pattern detecting means scanning the bar code along a scan trajectory that passes through not the first bar but the second bar; and joining means for joining the first bright/dark pattern and the second bright/dark pattern when number of characters comprising the overlapped portion checked by the overlapped portion checking means is more than predetermined number, said predetermined number being varied in proportion to number of characters of the bar code.

* * * * *